(12) United States Patent
Keeton et al.

(10) Patent No.: US 7,734,867 B1
(45) Date of Patent: Jun. 8, 2010

(54) DATA STORAGE USING DISK DRIVES IN ACCORDANCE WITH A SCHEDULE OF OPERATIONS

(75) Inventors: Kimberly Keeton, Berkeley, CA (US); Eric Anderson, Berkeley, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1763 days.

(21) Appl. No.: 10/150,595

(22) Filed: May 17, 2002

(51) Int. Cl.
*G06F 13/00* (2006.01)
(52) U.S. Cl. .................. 711/114; 711/151; 711/163
(58) Field of Classification Search .......... 711/114, 711/112, 151, 162, 163; 709/225, 232; 710/7; 713/320, 324
See application file for complete search history.

(56) References Cited

U.S. PATENT DOCUMENTS

| | | | | | |
|---|---|---|---|---|---|
| 5,461,266 | A | * | 10/1995 | Koreeda et al. | 307/125 |
| 5,659,704 | A | * | 8/1997 | Burkes et al. | 711/114 |
| 5,664,143 | A | * | 9/1997 | Olbrich | 711/112 |
| 5,687,390 | A | * | 11/1997 | McMillan, Jr. | 710/5 |
| 5,694,581 | A | * | 12/1997 | Cheng | 710/7 |
| 5,954,822 | A | * | 9/1999 | Yashiro et al. | 714/6 |
| 6,021,464 | A | * | 2/2000 | Yao et al. | 711/114 |
| 6,092,114 | A | * | 7/2000 | Shaffer et al. | 709/232 |
| 6,480,904 | B1 | * | 11/2002 | Kato et al. | 710/6 |
| 6,704,838 | B2 | * | 3/2004 | Anderson | 711/114 |
| 2001/0047412 | A1 | * | 11/2001 | Weinman, Jr. | 709/225 |
| 2003/0135609 | A1 | * | 7/2003 | Carlson et al. | 709/224 |
| 2003/0187972 | A1 | * | 10/2003 | Bauchot | 709/223 |
| 2004/0243761 | A1 | * | 12/2004 | Bohrer et al. | 711/114 |

OTHER PUBLICATIONS

C. Waldspurger and W. Weihl, "Lottery Scheduling: Flexible Proportional-Share Resource Management," Proc. of the First USENIX Symposium on Operating Systems Design and Implementation (OSDI), pp. 1-11, Nov. 1994.
R. Hagmann, "Reimplementing the Cedar File System Using Logging and Group Commit," Proc. of Symp. on Operating Systems Principles, pp. 155-162, Nov. 1987.
R. Henderson, A. Poston, "MSS-II and RASH: A Mainframe UNIX Based Mass Storage System with a Rapid Access Storage Hierarchy File Management System," pp. 65-84, Usenix, Winter 1989.

(Continued)

*Primary Examiner*—Mardochee Chery

(57) ABSTRACT

Techniques for data storage using disk drives. To conserve power and reduce heat generation so that higher packaging density is possible, only some of the disk drives in an array may be powered on at any one time. Disk accesses may then be scheduled so that appropriate drives are powered on and off at appropriate times. In addition, various levels of storage services may be provided depending, for example, upon how accessible the drives are to individual clients and upon a level of data redundancy provided. Another advantage includes off-loading of tasks to a controller or processor included within the disk drives themselves. For example, the disk drives themselves may compute error detection or error correction representations and perform data integrity checks based on those representations. Failure simulation may also be performed to verify the ability to recover lost data and the disk drives may be used to convert the data into general formats that may be expected to be more easily read in the future.

39 Claims, 2 Drawing Sheets

OTHER PUBLICATIONS

A. Chervenak, V. Vellanki and Z. Kurmas. "Protecting file systems: a survey of backup techniques," Proc. of Mass Storage Symp., 1998.

J. Douceur and W. Bolosky. "A large-scale study of file-system contents," Proc. of Sigmetrics 1999, pp. 59-69, May 1999.

J. Gray and P. Shenoy. "Rules of thumb in data engineering." Proc. of International Conference on Data Engineering, Feb. 2000.

R. Green, A. Baird and C. Davies. "Designing a Fast, On-line Backup System for a Log-structured File System," Digital Technical Journal, Oct. 1996.

D. Hitz, J. Lau, M. Malcolm. "File System Design for an NFS File Server Appliance," Proc. of Winter USENIX Technical Conference, pp. 235-246, Jan. 1994.

J. Johnson and W. Laing. "Overview of the Spiralog File System," Digital Technical Journal, 8(2):5-14,1996.

S. Lammert. "The AFS 3.0 Backup System," USENIX Proceedings of the 4th Conference on Large Installation System Administration, pp. 143-147, Oct. 1990.

E. Lee and C. Thekkath. "Petal: Distributed Virtual Disks," Proc. of Conference on Architectual Support for Programming Languages and Operating Systems (ASPLOS-VII), pp. 84-92, Oct. 1996.

R. Pike, D. Presotto, S. Dorward, B. Flandrena, K. Thompson, H. Trickey, P. Winterbottom. "Plan 9 from Bell Labs," Proc. of United Kingdom UNIX Systems User Group (UKUUG), pp. 1-9, Jul. 1990.

D. Santry, M. Feeley, N. Hutchinson, A. Veitch, R. Carton, J. Ofir. "Deciding when to forget in the Elephant file system," Proc. of the 17th Symp. on Operating Systems Principles (SOSP-17), pp. 110-123, Dec. 1999.

P. Lyman, H. Varian, J. Dunn, A, Strygin, and K. Swearingen. "How much information?" www.simsberkley.edu/how-much-information/. Downloaded Apr. 4, 2001. Copyright 2000.

E. Anderson, D. Patterson. "A Retrospective on Twelve Years of LISA Proceedings," Proceedings of LISA '99: 13th Systems Administration Conference, pp. 95-108, Nov. 1999.

"Network Appliance Announces NearStore TM Family to Address Enterprise Need for Business Continuance," http://www.netapp.com/news/press/2001/news_rel_20011210a.html, Network Appliance, Dec. 10, 2001.

D. Colarelli, D. Grunwald, and M. Neufeld. "The Case for Massive Arrays of Idle Disks (MAID)," Depart. of Computer Science, Univ. of Colorado, Boulder, Jan. 7, 2002.

E. Miller, R. Katz. "An Analysis of File Migration in a Unix Supercomputing Environment," 1993 Winter USENIX, Jan. 1993.

R. Pike, D. Presotto, S. Dorward, B. Flandrena, K. Thompson, H. Trickey, P. Winterbottom. "Plan 9 From Bell Labs," Computing Systems, vol. 8 #3, Summer 1995, pp. 221-254.

* cited by examiner

DATA STORAGE USING DISK DRIVES IN ACCORDANCE WITH A SCHEDULE OF OPERATIONS

FIELD OF THE INVENTION

The present invention relates to the field of data storage for computer systems. More particularly, the present invention relates to the field of disk-based storage systems that may be used for nearline, offline or backup data storage.

BACKGROUND OF THE INVENTION

Due to such factors as advances in technology, reductions in computer hardware costs and growth of the world wide web, increasing quantities of digital data are being generated worldwide. For example, computer systems in homes, businesses and government are used to generate data in the form of text and other documents, databases, multi-media files, e-mail correspondence, web pages, and so forth. As a result, data storage demands are enormous and are growing over time.

An important aspect of data storage is in backing up the data for both data recovery and archival purposes. Backup solutions depend on some form of data redundancy and provide for the restoration of critical data that may be lost in the event of user errors, software errors, independent media failures (e.g., a failure of a disk drive or other component), correlated failures (e.g., a site disaster or power supply failure), and failed communication links. Data archival often requires that the data can be read back after an extended period of time.

Due to their cost effectiveness, magnetic tapes are most commonly used for backup storage. However, magnetic tapes have a number of drawbacks. For example, random accesses to data are difficult and time-consuming. This is because the tape may need to be mechanically spooled forward or backward in order to access certain data on the tape. In addition, tape systems typically have few tape drives relative to the number of tapes, resulting in low levels of parallelism. Also, tape drive head drift can result in a drive being unable to read data that was recorded by a different drive and may even prevent reading of data that was recorded by the same drive, but at an earlier time. Further, magnetic tape degrades over time, limiting its effectiveness for long-term storage and necessitating frequent testing.

Another important aspect of data storage is in obtaining faster, or nearline, access to data. For example, hierarchical storage management (HSM) systems provide varying accessibility to data by providing disk storage in conjunction with a tape or optical disk storage array or "jukebox." Disadvantages of conventional HSM systems are similar those of tapes systems, as described above. For example, having to load media from the jukebox to a limited number of readers tends to make random accesses unacceptably slow.

It has been suggested that the prices of hard disk drives are approaching that of nearline tapes and, as a result, disks could replace tapes under certain circumstances. "Rules of Thumb in Data Engineering," J. Gray and P. Shenoy, Proc. of Intl. Conf. on Data Engineering, February 2000. Disk drives, however, tend to have higher power requirements than other data storage devices, even when idle, and, thus, tend to be packaged less densely so they stay cool. In addition, disk drives tend to be inflexible in their handling of outstanding access requests in that typically only a small number of outstanding requests are permitted at any one time. Also, disk drives aren't used as removable media for archival purposes.

Therefore, what is needed are improved techniques for data storage. It is to this end that the present invention is directed.

SUMMARY OF THE INVENTION

The invention provides techniques for data storage using disk drives that achieve certain advantages over conventional data storage techniques. In one embodiment, to conserve power and reduce heat generation so that higher packaging density is possible, only some of the disk drives in an array may be powered on at any one time. Disk accesses may then be scheduled so that appropriate drives are powered on and off at appropriate times. In another embodiment, various levels of storage services may be provided to clients of the data storage system depending, for example, upon how accessible the drives are to individual clients or upon the level of data redundancy provided. In a further embodiment, tasks may be off-loaded to the data storage system itself such as to a controller or processor included within the disk drives. For example, the disk drives themselves may compute error detection or error correction representations and proactively perform data integrity checks based on those representations. In another embodiment, the disk drives may be used to convert the data from formats generated by the client systems into more general formats that may be expected to be more easily read in the future. In yet another embodiment, failure simulation may be performed in the disk drives to verify the ability to recover lost data.

DETAILED DESCRIPTION OF A PREFERRED EMBODIMENT

Figure 1:
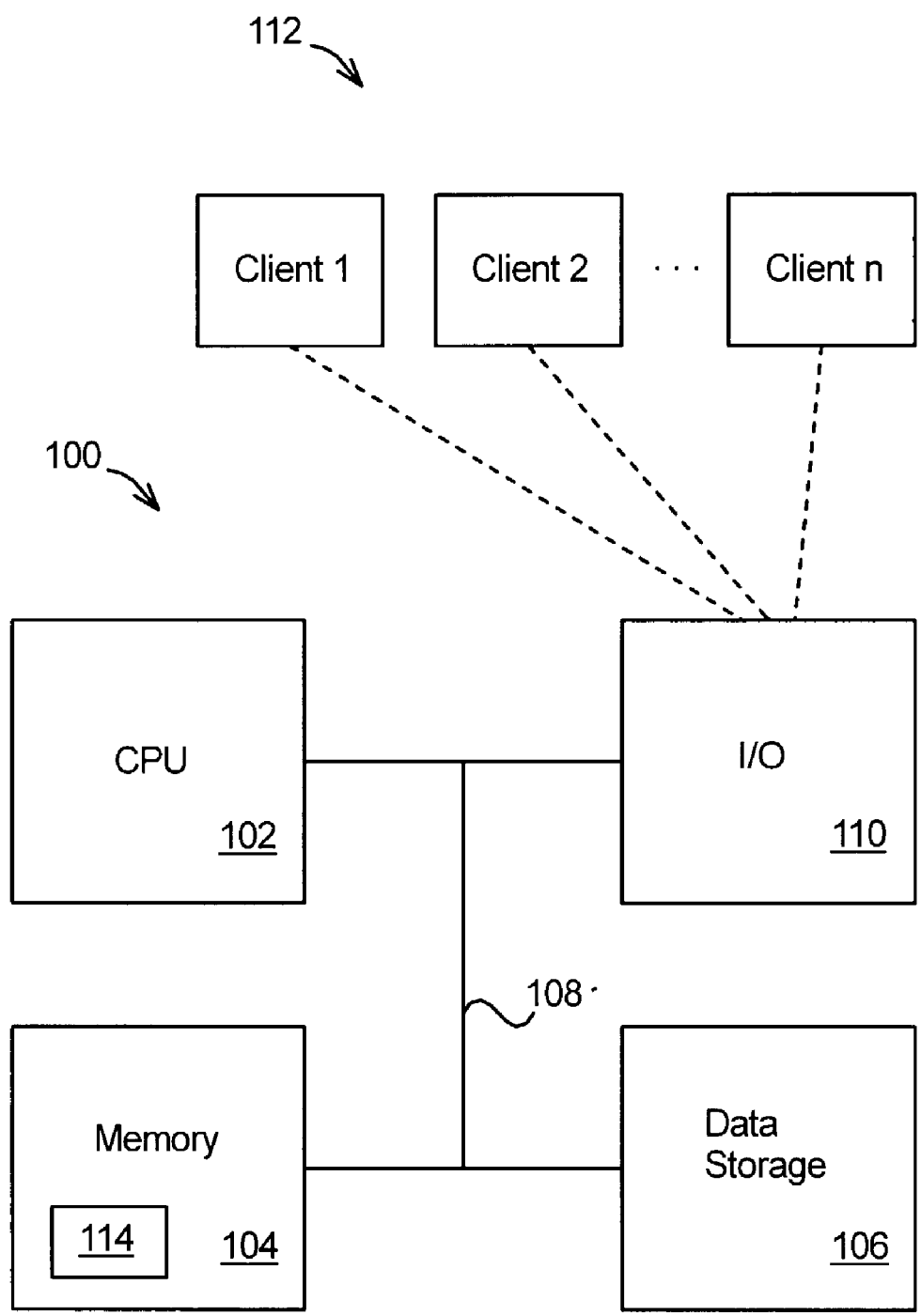
FIG. 1 illustrates a block schematic diagram of a network server and data storage system by which the present invention may be implemented.

FIG. 1 illustrates a block schematic diagram of a computer system 100 by which the present invention may be implemented. The computer system 100 may include a general-purpose processor 102, memory 104 (e.g., RAM and/or hard disks), data storage 106, a communication bus 108, and input/output devices 110, such as a keyboard, monitor, mouse and network interface. The computer system 100 is conventional. As such, it will be apparent that the system 100 may include more or fewer elements than shown in FIG. 1 and that other elements may be substituted for those illustrated in FIG. 1.

The computer system 100 functions as a data storage system, such as for primary data storage or for backup storage. Accordingly, the system 100 may store data that is generated by, or received from, a number of networked client systems 112 and which may be a primary copy of data or redundant data. The client systems 112 may be, for example, workstations. In another aspect, the client systems 112 may have their own clients (not shown). For example, a client system 112 may include a file server or database server whose clients are, for example, workstations. If a primary copy of the data is stored in the data storage 106, clients may perform online accesses to the data storage system directly, or via a local client caching algorithm. Data that is redundant of the data at the client 112 may be stored in the data storage 106. When an event occurs which results in loss of data at one of the client stations 112, the system 100 may restore the lost data to the appropriate one (or more) of the clients 112 by retrieving the redundant data from the storage 106 and communicating the retrieved data to the client(s) 112. One or more software programs ("storage software") 114 for implementing the present invention may be stored in the memory 104.

Figure 2:
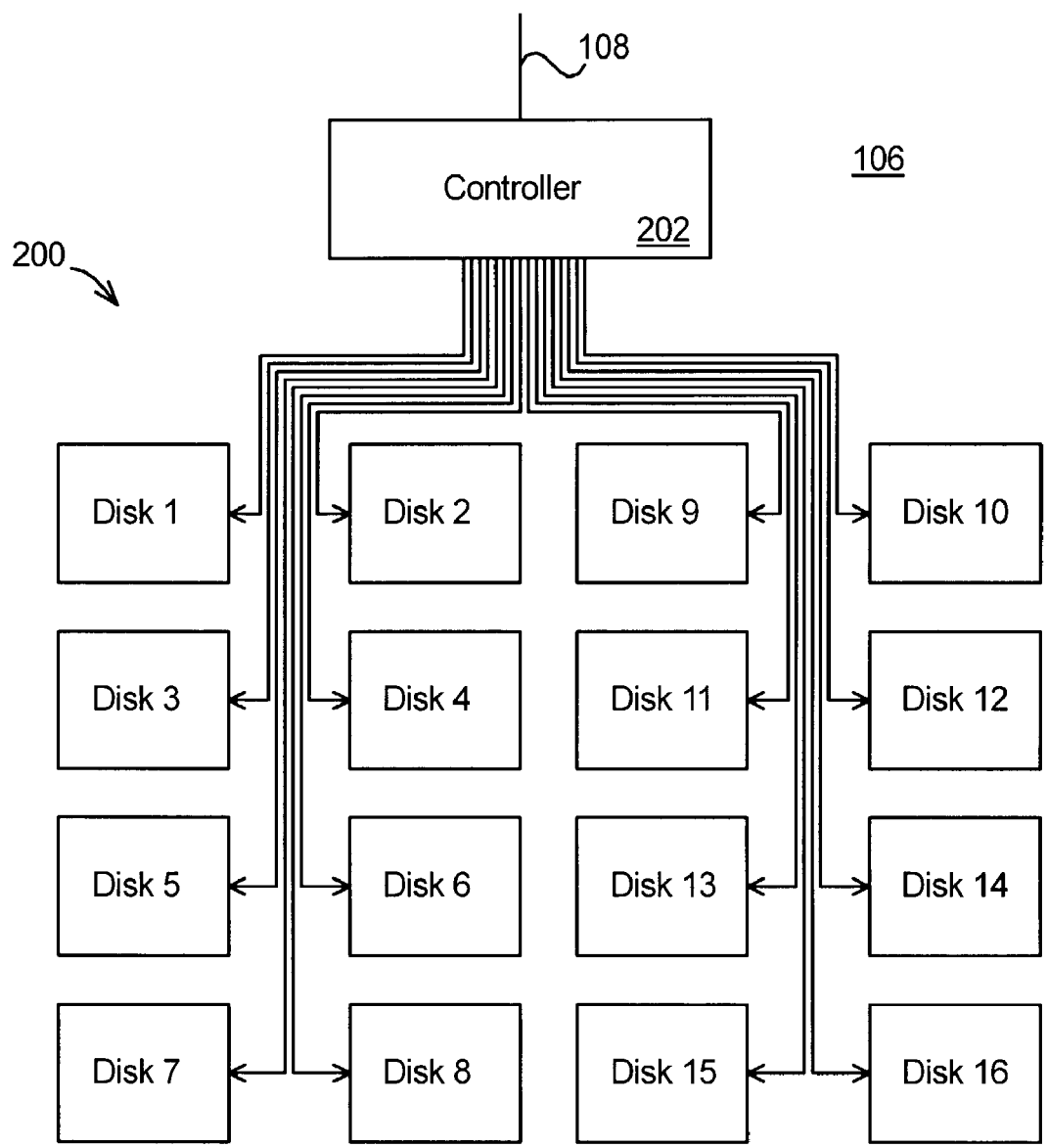
FIG. 2 illustrates a more detailed diagram of the data storage system of FIG. 1, including an array of disk drives.

FIG. 2 illustrates a more detailed system diagram of the data storage 106 of FIG. 1, including an array of disk drives 200. As used herein, the term "array" simply refers to a collection, grouping or arrangement of disks, also referred to as a JBOD (Just a Bunch of Disks) and is not necessarily meant to refer to disk arrays having specialized capabilities, such as calculating RAID redundancy (though, as explained herein, novel capabilities may be included in the array 200). As shown in FIG. 2, a controller 202 may be coupled to the disk drives of the array 200 and to the bus 108 of FIG. 1. Thus, the controller 202 functions as an interface between the disk drive array 200 and the remainder of the system 100 of FIG. 1. Accordingly, data from the client systems 112 may be communicated to the system 100 via the controller 202 and then stored in the disk drive array 200. In some circumstances, multiple controllers 202 may be provided, such as to prevent the controller 202 from becoming a single point of failure. Alternately, the controller 202 may be omitted. In this case, communications from the clients 112 may be directly with the array 200.

As the number of disk drives in the array 200 increases, so does the likelihood that one or more of the disk drives will fail. Accordingly, data may be stored redundantly across multiple of the drives. Such redundancy within the array 200 is separate from any redundancy resulting from the data in the array 200 being redundant of data at the clients 112. Redundancy within the array 200 may be provided by storing the data in accordance with threshold coding schemes, such as erasure codes, including parity-based schemes, such as RAID (Redundant Array of Inexpensive Disks), or by storing duplicate copies of the data (also referred to as "mirroring" or RAID level 1). Other failure prevention or redundancy techniques may also be used, such as the incorporation of disk drives of different manufacturers into a single array or the provision of redundant hardware, such as fans, power supplies and the like.

Managing Resources of the Disk Array

Provision of resources of the storage system 100 to the client stations 112 and/or individual users (collectively referred to as "clients") is managed in accordance with an aspect of the invention. Generally, when a client system 112 or user requires service from the storage system 100, e.g., for storing or retrieving data, the client station 112 issues a request to the storage system 100. The storage system 100 forms a schedule of operations (or "task schedule") based on the requests for services received from client systems 112 and upon resource management criteria described in more detail herein. The storage system 100 then performs the requested operations in accordance with the schedule. As the storage system 100 performs the operations, new requests may be received from the clients 112 and, in response, the schedule is appropriately altered. In this manner, the client systems 112 obtain access to the disk array 200.

In one aspect, less than all of the disk drives in the array 200 may be powered on at any one time. For example, read or write operations to the disk drive array 200 may be scheduled to be performed such that only selected ones of the disk drives are required at any one time. The selected disks may, for example, include a parity-based redundancy group or may hold mirrored copies of the data being written. Once write operations to those selected disk drives are complete, they may be powered off, while a next selected set of disk drives may be powered on to perform additional operations in the schedule.

Similarly, for read or write operations performed on the disks of the array 200, e.g., for client access to data, data recovery or data verification, a list of data files or blocks required to be read may be used to form the schedule of operations. For example, metadata or file directory information may be scheduled to be read before the associated data files are read or written. This may be necessary since the metadata may indicate locations of the data to be read or written. Similarly, after write operations are performed, metadata may need to be updated to reflect the changes to the updated data. As used herein, "metadata" refers to data about data and may include information associated with a file in a file directory system, such as its handle, filename or location, or with the structure of the file system. Metadata may also include other information about data, such as information related to a database system, such as its structure, system catalog or indices.

Preferably, the requested write operations and read operations are scheduled so as to balance competing goals. One such goal is to avoid frequently powering various disks up or down. Another such goal is to avoid excessive delays while a client system 112 awaits requested services. Thus, in one aspect, all or at least a predetermined number of pending read and write operations to a particular disk (or group of disks) may be grouped to be performed during a single power on cycle of the disk (or the group of disks). Further, priorities may be assigned to various read and write requests. Accordingly, it is preferred that requested operations of higher priority are generally performed earlier than requested operations of lower priority.

One way the schedule of operations may be formed is to power on the disks of the array 200 in accordance with a predetermined sequence and, then, performing all of the pending operations to that disk in accordance with their respective priorities before powering the disk down. If multiple disks are required for a particular operation, such as where the disks are part of a RAID set, then those disks may be powered on as a group in accordance with the sequence.

Another way the schedule of operations may be formed is to determine from the pending requests which disks to power on next. For example, all of the pending read and write operations may be grouped according to which disk or group of disks is required to service the requests. Then a determination may be made as to which disk or group of disks is required by the highest number of pending operations. This number may be weighted by priority levels assigned to the requests. That disk or group of disks may then be scheduled to be powered on next in the schedule. This process may then be repeated for each group of requests, thereby continually powering up and down the most-requested disks. To ensure that none of the pending requests awaits service for too long, all of the pending requests may be time-stamped. Once a time stamp reaches a predetermined maximum age, then the required disk or disks may be scheduled to be powered on next regardless of the number of pending requests that require that disk or disks. It will be apparent that various other schemes may be used to form the task schedule.

As a result of powering only some of the disk drives in the array 200 at any one time, power and cooling requirements for the array 200 are reduced and potential packaging density of the disk drives 200 is increased. For example, assuming the array 200 is contained in a single enclosure, smaller capacity cooling fans and power supplies may be used than would be needed if all of the disk drives 200 were powered on simultaneously. As mentioned, however, redundant fans and/or power supplies may be provided for increased reliability.

In accordance with another aspect of the invention, upon detection of a failure, certain data may be more immediately restored (e.g., by assigning a high priority to the related operations), while other data deemed less important may take longer to restore (e.g., by assigning a lower priority to the related operations). For example, restoration of metadata, e.g., directory data structures, may be deemed more important for restoration than the related data, e.g., underlying file or application data. Accordingly, the metadata may be inserted into the task schedule for immediate action, while restoration of the related data may be scheduled for restoration some time later. As another example relating to database systems, a system catalog and primary data (e.g., a database table) may be recovered before database indices or materialized views. As yet another example, selected frames of a video sequence (e.g., a movie) may be recovered prior to the entire sequence. It should be noted that the examples above are not intended to be limiting and that data deemed more important in one context may be deemed less important in another context.

Further, data that is to be more immediately restored, such as metadata (e.g., a file directory structure), may be stored in one or more disk drives of the array 200 that are usually powered on (such drives may be occasionally powered down, such as for maintenance, removal and during periods when the entire array 200 is powered down, but are substantially maintained powered on). However, the related data, such as underlying data files, may be stored in other disk drives of the array 200 that may be selectively powered off during operation of the storage system 106. Accordingly, a directory structure, for example, may be generally obtained more immediately from a powered on disk drive. It may take more time, however, to power up an initially powered down disk drive to obtain the underlying file or application data. As mentioned, powered-off drives may be powered on as needed in accordance with a schedule. Accordingly, the underlying data (e.g., file data or data in a database table) may take more time to restore than the metadata (e.g., directory data or system catalogs).

In another aspect, data stored in the disk array 200 may be mirrored within the array 200. Thus, where two disks each store the same mirrored information, one of the disks may be usually powered off to conserve power, while the other disk may be usually powered on for faster access to the data should it be required to satisfy a client request (e.g., for data restoration).

In accordance with another aspect of the invention, the level of resources of the backup system 100 that are allocated to individual users or to groups of users may be managed. A system administrator may allocate, for example, access times, scheduling priorities, storage capacity, the period of time that redundant data is retained (also referred to as "data longevity"), the type of redundancy provided (mirroring or parity-based redundancy), off-site or remote-site storage, single or multiple redundant versions of data, copy-on-write redundancy (as opposed to maintaining a complete redundant version of the data) and so forth. Note that individual disk drives may also be removed from the array 200 for archival storage or for off-site storage.

These resources may be allocated according to service levels purchased by various user entities. For example, when access to data or recovery of data is required, required operations may be scheduled in accordance with priorities assigned to the client stations 112. The priorities may be assigned in accordance with a level of service purchased by the users of the system 100. Accordingly, those users who enjoy more immediate data recovery because of their higher priority will pay a premium for this level of service.

Some users may subscribe to a level of service which includes immediate metadata access. In this case, all of the metadata for those users may be stored in one or more disks of the array 200 that are usually powered on. Metadata for other users that subscribe to a lower level of service may be stored on disk drives 200 that are usually powered off. Thus, for access to metadata or failures which require restoration of metadata, metadata stored on disks 200 that are usually powered on will generally be more immediately available in comparison to metadata stored on drives 200 that are usually powered off. Accordingly, those users who enjoy more immediate directory recovery will pay a premium for that level of service. Optionally, in addition to the metadata, underlying data (e.g., file or database data) for certain users may also be stored on drives that are usually powered on.

In yet another example, different redundancy schemes may be provided depending upon the level of service to which the clients 112 subscribe. Thus, for one level of service, data may be stored in the array 200 without additional protection. If a disk of the array 200 fails, then that data may not be available for recovery in the event of the failure at the client station 112. For another, higher, level of service, data may be stored on the array 200 using parity-based techniques (e.g., RAID-5). In the event of a failure at a client station 112 and of one disk in a parity set, the data can be restored from the remaining disks of the set. Accordingly, data may still be recovered despite a plurality of failures.

Yet another level of service may specify that data is stored in the array 200 in accordance with mirroring techniques. In this case, writing data to the array 200 may be performed more quickly in comparison to the encoding required for some redundancy schemes. In addition, under certain circumstances, read access to data by a client system 112 from a mirrored copy may occur more quickly in comparison to data stored in accordance with other redundancy techniques. For example, in the event of a failure of a disk in the array 200, data stored in accordance with parity-based techniques would generally need to be restored within the redundancy group before it would be available to a client system 112. Rather, a remaining copy of mirrored data would be immediately available. While it may be necessary to re-mirror the data to ensure continued availability of redundant data, this could be done after the restoration is complete.

Because more system resources are generally consumed for mirroring than for parity-based techniques, those users whose data is mirrored will pay a corresponding premium. And, because more system resources are used for parity-based techniques than for no additional redundancy, those users whose data is stored using parity-based techniques may pay a next highest premium. Finally, those users whose data is stored without additional redundancy may pay a lower premium.

In the case of backup storage, service levels may also be based on how and how often data is backed up. For one level of service, full back-ups of a user's entire data, or portion thereof, may be performed periodically. For another level of service, these full-backups may be augmented with incremental back-ups. Incremental back-ups may be made in accordance with copy-on-write techniques. The service level may include transporting a backup copy to a remote storage location or simply retaining the backup copy in the storage system 200. Further, the service levels may specify how frequently each type of backup operation is performed.

In addition to providing various redundancy levels, the storage system 100 may provide levels of services to clients 112 based on performance parameters, such as bandwidth, throughput or response time. For example, a maximum level of a performance parameter of the storage system 100 (e.g., throughput) that is available to a particular client may depend on a level of service assigned to the client. As another example, a minimum guaranteed level of a performance parameter (e.g., response time) may be assigned to the clients 112. Thus, clients 112 who purchase or are otherwise assigned higher levels of service may, thus, receive higher performance levels from the same storage system than clients who are assigned lower performance levels.

Accordingly, techniques have been described for improving control and management of resources of a system for data storage.

Off-Loading Operations to the Disk Array

In accordance with another aspect of the invention, certain operations in support of data backup, recovery and verification may be offloaded from the processor 102 (FIG. 1) of the system 100 or from the controller 202 to the disk drives 200 themselves. This is because each drive in the array 200 will generally include a controller or a general-purpose processor which may be capable of performing certain functions not conventionally performed by storage devices. As a result, the system processor 102 is more available to perform other functions, while processing capabilities inherent in the drives 200 themselves are more fully utilized. Operations may also be offloaded from the processor 102 to the controller 202 since the controller 202 will generally include processing capabilities.

In one aspect, the processing capabilities of the disk drives 200 are used for data scrubbing operations. To accomplish this, data may be stored at the disk drives 200 along with error detection representations (e.g., a checksum or hash value) or error correction representations (e.g., Reed-Solomon codes, or RAID parity) associated with each data block. For example, computations of the error correction or error detection representations may be performed at each of the disk drives in the array 200 when the data is initially stored or later, when it is accessed. Further, data scrubbing operations may be initiated by the disk array 202 in response to write or read operations requested by the client systems 112. These operations may also be self-initiated by the disks periodically or during periods of low disk access activity, to test the integrity of the stored data. More particularly, in the case of error detection, each of the disk drives 200 may periodically test the integrity of the data that it stores by re-computing error correction representations and comparing each recomputed representation to a previously computed representation for the same data. If there is a match, this indicates that the corresponding data has not changed and, thus, its integrity is confirmed. Otherwise, computed representations that do not match indicate a loss of integrity in the corresponding data.

In the case of error correction, each of the disk drives 200 may also correct errors using the stored error correction codes. These operations are preferably not performed by the system processor 102, but instead, by using processing capabilities of the individual drives of the array 200. Further, these data integrity operations may be performed, not only at the block level, as explained above, but at the system and application levels. For example, error detection or error correction codes may be computed for file directories, individual files, database tables, indices and entire file systems.

In one aspect, application data, such as a data file or other collection of related data, may be stored across multiple disk drives of the array 200. For example, a file may be striped across multiple disk drives in accordance with RAID-5. To perform error detection, or error correction in such circumstances on one of the disks, it may be necessary to access the related data on other disks of the array 200. This is because the error detection checksums and error correction codes may relate to the application data as a whole and not only to the individual portions of the file stored at each disk. Data boundaries may be originally supplied by the clients 112. However, so that the disk drives are themselves able to perform error detection and correction tasks, each disk may keep track of the location of data on other disk drives in the array 200 that is related to its own data. This may be accomplished by storing metadata on a disk that indicates the locations of data on other disks that is related to the data on the disk. Similarly, each disk in the array 200 may store metadata relating to data on other disks. Thus, when a disk performs error detection or correction, it consults its own metadata to determine the locations on other disks in the array 200 of data that it will access to perform the error detection or correction operations. When an update is performed to data that is stored across multiple disks, all of the metadata on the disks will also be updated to ensure that it continues to accurately reflect the locations of related data on other disks.

In addition, correctness of a redundant representation of data may be verified by simulating failures of hardware, such as a selected disk or disks in the array 200, and determining whether the data is correctly reconstructed. For example, failure of a disk of a redundancy group or mirrored copy may be simulated. This may be accomplished by powering off or otherwise avoiding access to (e.g., by blocking or inhibiting access or simply not accessing) one or more of the disk drives 200 which is included in the redundancy group and, then, reconstructing its data from the remaining disk drives 200 of the group. The reconstructed data may then be verified against the original data (e.g., by comparing the reconstructed data to the data on the avoided disk or by comparing a checksum for the reconstructed data to a checksum for the data on the avoided disk). If there is a match, this indicates that the data was properly reconstructed. Otherwise, if the data does not match, then a problem is indicated with the storing or the reconstruction of the data. In response, corrective action may be taken to avoid loss of data in the event an actual (not simulated) failure occurs of the disk. As another example, failure of selected portions of a disk drive may be simulated (e.g., by the disk drive avoiding access to those portions) and an attempt made to reconstruct data stored by the selected portions. Note that avoiding access for test purposes is another example of off-loading processing tasks to the disk drives.

When some of the disk drives of the array 200 are powered down, others will need to be selectively powered on in order to perform the data integrity verification operations or the failure simulation operations. Accordingly, these operations may be inserted into the task schedule so that the affected drives of the array 200 will be powered on at appropriate times. These data integrity operations may be performed when the disk array 200 is not otherwise occupied with client initiated operations. For example, data integrity verification and failure simulations may be performed during periods of low demand for storage system 100 resources by the client stations 112.

The system 100 of FIG. 1 may be employed to convert the data from a format generated by the client systems 112 to another format for storage by the drives 200. An application running on a client system 112 (or its client, in case the client 112 is a server) may generate data that has a format which is specific to the application. For example, a word processing program may generate a file that is specific to that word processing program. Prior to storage by the drives 200, the application data may be converted to a more general format (e.g., image bitmap or text) that may be expected to be more easily read in the future. Thus, in the example, the specific word processing format may be converted to general text format, such as plain text (.txt), html (.html), rich text format (.rtf) or a printed image bitmap. In another example, data may be converted from one image format (e.g., a JPEG image file) to another (e.g., an image bitmap). These format conversion operations may be performed by the processor 102 of the system 100 or by the controller 202 or by using processing capabilities of the disk drives 200 themselves, similarly to the manner in which data integrity verifications may be performed by the disk drives 200, as explained above. Alternately, these format conversion operations may be performed by the clients 112, e.g., as part of the process of transferring the data to the system 100.

Thus, techniques have been described for offloading certain operations in support of data backup, recovery and verification not conventionally performed by backup storage devices to the disk drives 200 themselves.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A method of accessing data storage comprising:
    forming a schedule of operations based on requests received from a plurality of storage clients, including forming groups of the requests to be performed on one or more disk drives in an array of disk drives;
    selectively powering on and off disk drives in the array of disk drives, at least one of the disk drives being powered off while one or more disk drives are powered on; and
    accessing one or more disk drives for performing the groups of requests while powered on in accordance with the schedule, wherein at least some metadata and its associated underlying data are stored on separate disk drives in the array.

2. The method according to claim 1 at least one of the disk drives that stores the metadata is usually powered on.

3. The method according to claim 2 wherein the metadata comprises file directory data and data files of the file directory data are maintained in one or more disk drives that are selectively powered on in accordance with the schedule.

4. The method according to claim 2 wherein the metadata comprises metadata for a database and data of the database is maintained in one or more disk drives that are selectively powered on in accordance with the schedule.

5. The method according to claim 1 wherein at least two of the disk drives of the array store metadata and wherein a first one of the two disk drives is substantially maintained powered on and a second one of the disk drives is selectively powered on in accordance with the schedule.

6. The method according to claim 1 wherein at least two of the disk drives of the array store the same mirrored data and wherein a first one of the two disk drives is substantially maintained powered on and a second one of the disk drives is selectively powered off in accordance with the schedule.

7. The method according to claim 1 further comprising assigning at least two different service levels to the clients.

8. The method according to claim 7 wherein said assigning service levels comprises assigning priorities to the clients; and wherein said schedule for accessing the disk drives is formed in accordance with the assigned priorities.

9. The method according to claim 7 wherein said assigning service levels comprises assigning redundancy levels to the clients and further comprising storing the data in the array of disk drives in accordance with the assigned redundancy levels.

10. The method according to claim 9 wherein the redundancy levels include a level in which a single copy of data is stored in the array of disk drives and a level in which a redundant representation of the data is stored in the array of disk drives.

11. The method according to claim 9 wherein the redundancy levels include a level in which the data is mirrored in the array of disk drives.

12. The method according to claim 9 wherein the redundancy levels include a level in which the data is stored in accordance with erasure-coding or parity-based redundancy.

13. The method according to claim 9 wherein the redundancy levels are selected from the group consisting of: primary copy without redundancy, mirroring, erasure-coding and parity-based redundancy.

14. The method according to claim 7 wherein said assigning service levels comprises assigning a level in which data is stored in the array of disk drives in accordance with copy on write.

15. The method according to claim 7 wherein said assigning service levels comprises assigning longevity of data to the clients.

16. The method according to claim 7 wherein said assigning service levels comprises assigning storage capacity for data to the clients.

17. The method according to claim 7 wherein said assigning service levels comprises assigning performance levels to the clients and further comprising providing access to the data in the array of disk drives in accordance with the assigned performance levels.

18. The method according to claim 17 wherein the performance levels are selected from the group consisting of: bandwidth, throughput and response time.

19. The method according to claim 7 further comprising removing one or more individual disk drives from the array of disk drives for data archival.

20. The method according to claim 1 further comprising powering off the one or more selected disk drives after completing said accessing.

21. The method according to claim 1 wherein the one or more disk drives selected to be powered on are required to service a highest number representing pending requests.

22. The method according to claim 21 wherein the highest number is determined by weighting the pending requests according to priority.

23. The method according to claim 22 further comprising time-stamping pending requests.

24. The method according to claim 23 further comprising scheduling a pending request to be serviced once its time stamp reaches a maximum age.

25. A method of format conversion for storing data comprising:
    receiving data from a plurality of client systems, the data being in a format generated by a client application;
    storing the data in an array of disk drives; and converting a format of a selected portion of the data in the array from the format generated by the client application to another format using processing capabilities of the storage system.

26. The method according to claim 25 wherein said converting is performed using processing capabilities of the disk drives themselves.

27. The method according to claim 25 wherein said array comprises an array controller and said converting is performed using processing capabilities of the array controller.

28. The method according to claim 25 wherein said converting comprises converting the format of the selected portion of the data from a format specific to an application program to a general format.

29. The method according to claim 28 wherein said converting comprises converting the format of the selected portion of the data from a format specific to a word processing application program to a general text format.

30. The method according to claim 28 wherein said converting comprises converting the format of the selected portion of the data from a format specific to an image file format to a bitmap format.

31. The method according to claim 28 wherein said converting comprises converting an application-specific format to a bitmap or text format.

32. A method of accessing data storage comprising:
receiving requests for storage operations from a plurality of storage clients;
selectively powering on and off disk drives in an array of disk drives in accordance with a predetermined sequence, at least one of the disk drives being powered off while one or more selected disk drives are powered on; and
accessing one or more of the disk drives while powered on in accordance with the sequence, including performing pending requests for the one or more disk drives being powered on, wherein said predetermined sequence is based at least in part on a determination of which of said disk drives in said array are required by a highest number of said pending requests.

33. The method according to claim 32 powering off the one or more selected disk drives after completing said accessing.

34. The method according to claim 32 wherein at least one of the disk drives of the array stores metadata.

35. The method according to claim 34 at least one of the disk drives that stores the metadata is usually powered on.

36. The method according to claim 35 wherein the metadata comprises file directory data and data files of the file directory data are maintained in one or more disk drives that are selectively powered on in accordance with the predetermined sequence.

37. The method according to claim 35 wherein the metadata comprises metadata for a database and data of the database is maintained in one or more disk drives that are selectively powered on in accordance with the predetermined sequence.

38. The method according to claim 32 wherein at least two of the disk drives of the array store metadata and wherein a first one of the two disk drives is substantially maintained powered on and a second one of the disk drives is selectively powered on in accordance with the predetermined sequence.

39. The method according to claim 32 wherein at least two of the disk drives of the array store the same mirrored data and wherein a first one of the two disk drives is substantially maintained powered on and a second one of the disk drives is selectively powered on in accordance with the predetermined sequence.

* * * * *